United States Patent [19]

Lyon

[11] Patent Number: 4,478,543
[45] Date of Patent: Oct. 23, 1984

[54] BLIND RIVET

[75] Inventor: Lyman R. Lyon, Bloomfield Hills, Mich.

[73] Assignee: Microdot Inc., Darien, Conn.

[21] Appl. No.: 342,176

[22] Filed: Jan. 25, 1982

[51] Int. Cl.³ .............................................. F16B 13/04
[52] U.S. Cl. ........................................ 411/34; 411/15; 411/908
[58] Field of Search ......................... 411/34, 35, 36, 37, 411/38, 21, 22, 23, 15, 501, 506, 507, 54, 908

[56] References Cited

U.S. PATENT DOCUMENTS

| | | | |
|---|---|---|---|
| 2,994,933 | 8/1961 | Wolfe | 411/909 X |
| 3,107,572 | 10/1963 | Orloff | 411/34 |
| 3,358,550 | 12/1967 | Crowther | 411/34 |
| 3,492,909 | 2/1970 | Triplett | 411/34 |
| 3,568,311 | 3/1971 | Lawton | 411/908 X |
| 4,203,346 | 5/1980 | Hall | 411/34 |
| 4,306,824 | 12/1981 | Tanaka | 411/34 |

FOREIGN PATENT DOCUMENTS 510011  2/1955  Canada .................................. 411/34

Primary Examiner—Gary L. Smith
Assistant Examiner—Adrian H. Whitcomb, Jr.
Attorney, Agent, or Firm—Lyman R. Lyon

[57] ABSTRACT

The disclosure relates to a blind plastic rivet having a fully polymerized head and shear portion and a partially polymerized head forming portion. The head forming portion is deformed upon heating due to tensioning of a centrally disposed mandrel thereby to form a blind rivet having a fully polymerized blind head.

7 Claims, 8 Drawing Figures

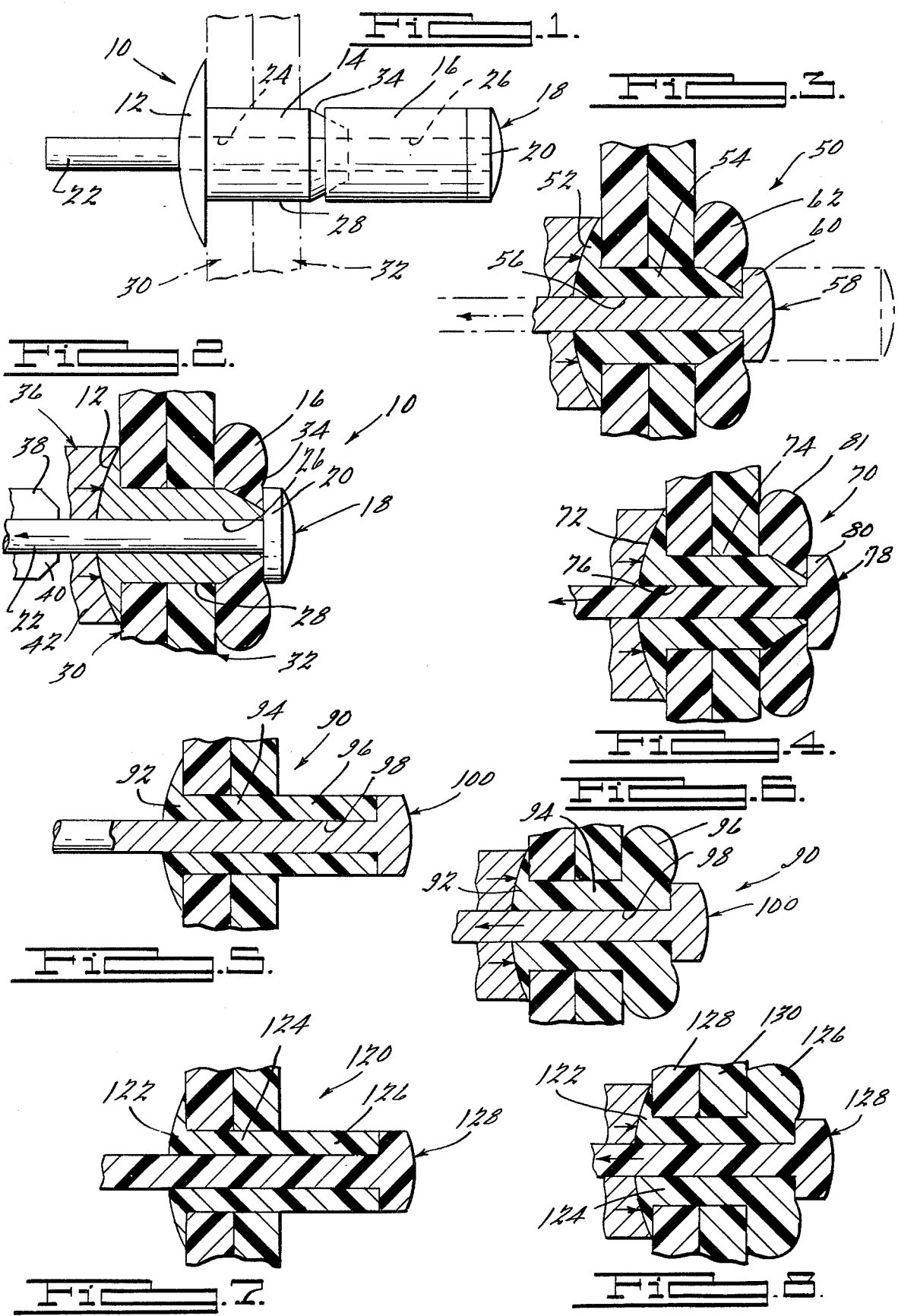

BLIND RIVET

BACKGROUND OF THE INVENTION

The aircraft industry has developed a number of airframe components utilizing modern composite materials, for example, carbon fiber reinforced resins. Despite the fact that such materials exhibit outstanding strength to weight characteristics, use thereof has been limited by the difficulty of fastening such materials. Conventional fasteners have proved to be unsatisfactory for several reasons. One characteristic of composite materials is that the material adjacent the periphery of an aperture therein is subject to shattering or cracking when relatively high unit pressure is brought to bear thereagainst. For example, conventional metal rivets often exhibit metal flow incident to the head upsetting operation that induces high unit pressure on the periphery of the rivet hole. Failure of the composite structure under or adjacent the rivet head may not be evident or even immediate. However, subjection of an airframe to the vibratory environment encountered during normal flight conditions or severe loading as is experienced in inclement weather conditions may result in failure of the composite structure.

While plastic rivets or rivets having plastic heads have been utilized heretofore, such rivets generally do not exhibit characteristics suitable for aircraft applications or applications requiring relatively high strength. For example, the patent to Luth U.S. Pat. No. 2,366,274 teaches forming a plastic rivet by the application of heat to mold soften and cure a thermoplastic material. Luth teaches the use of a thermoplastic material that is initially in the form of a powder that is supported within dies in registry with apertures in two parts to be joined. The powdered material is thereafter cured to form a thermoplastic rivet.

Similarly, the patent to Baker U.S. Pat. No. 2,391,938 teaches molding of a plastic rivet about both sides of a workpiece having an aperture therein. A suitable moldable material which may be thermoplastic or thermosetting in nature is induced into a cavity surrounding the aperture in the workpiece and thereafter cured.

It is evident, however, that riveting of composite subassemblies on a production basis does not allow for the utilization of dies placeable on opposite sides of the workpiece to contain and thereafter cure a moldable resin in either liquid or powder form. Moreover, since most aircraft assemblies are relatively large in terms of surface area, it is preferable that rivets utilized to hold, for example, skins to supporting structures, be capable of assembly from only one side of the workpiece. Such rivets are known in the art as "blind" rivets.

Another desirable feature of a an aircraft rivet is that it be capable of installation by relatively small tools that do not exhibit a vibratory interaction with the rivet.

SUMMARY OF THE INVENTION

The blind rivet of the present invention utilizes a shear portion that is accepted within aligned apertures in a workpiece. The rivet has a preformed head at one end of the shear portion and a central aperture therethrough for the acceptance of a headed mandrel. An incompletely polymerized or "B" stage thermoset resin portion of the rivet is disposed about the mandrel at the opposite end of the shear portion from the head thereon. Tensioning of the mandrel effects compression of the "B" stage thermoset resin portion which is softened due to the application of heat. The mandrel forms a radially extending blind head that is interlocked with the shear portion of the rivet to draw the workpieces together and which, when fully polymerized, forms a permanent thermoset riveted connection.

BRIEF DESCRIPTION OF THE DRAWINGS

FIG. 1 is an elevational view of a blind rivet in accordance with the instant invention;

FIG. 2 is a cross-sectional view of an embodiment of the instant invention wherein the pre-formed head and shear portion of the rivet are metal and the formable head thereof is "B" stage thermoset resin;

FIG. 3 is a view, similar to FIG. 2, wherein the preformed head and shear portions of the rivet are fully cured thermoset resin, the formable head is "B" stage thermost resin, and the mandrel is metal;

FIG. 4 is a view similar to FIG. 2 wherein the preformed head and shear portion of the rivet are fully polymerized thermoset resin, the formable head is "B" stage thermoset resin, and the mandrel is fully polymerized thermoset resin;

FIG. 5 is a view of another embodiment of the instant invention wherein the preformed head and shear portions of the rivet are fully polymerized, the formable head portion is partially polymerized resin, and the mandrel is metal.

FIG. 6 is a view similar to FIG. 5 illustrating tensioning of the mandrel to form a blind head on the rivet;

FIG. 7 is a view similar to FIG. 5 of yet another embodiment of the instant invention utilizing a plastic mandrel; and FIG. 8 is a view of the rivet of FIG. 7 wherein the mandrel is tensioned to form a blind side head on the rivet.

DETAILED DESCRIPTION OF THE PREFERRED EMBODIMENT OF THE INVENTION

As best seen in FIG. 1 of the drawings, a blind rivet 10 in accordance with a constructed embodiment of the instant invention comprises a head portion 12, a shear portion 14, a partially polymerized or "B" stage resin head forming portion 16 and a mandrel 18. The mandrel 18 has an anvil 20 at one end thereof and a tensioning stem 22 at the other end thereof. The mandrel 18 extends through complementary apertures 24 and 26 in the shear and head forming portions 14 and 16, respectively, of the rivet 10.

In the embodiment shown in FIG. 1, the shear portion 14 of the rivet 10 has a cylindrical outer surface 28 that is coextensive with the cumulative thickness of a pair of workpieces 30 and 32. The end of the shear portion 14 opposite from the head 12 is provided with a truncated conical surface 34 to facilitate axial movement and radial expansion of the head forming portion 16 thereover. The end of the conical surface 34 also functions as a stop for the anvil 20 of the mandrel 18.

As best seen in FIG. 2, the mandrel 18 is pulled to the left, as seen in the drawings, by a suitable tool 36 having heated jaws, 38 and 40, and a head portion 42 which engages the head 12 of the rivet 10 to maintain a bias thereagainst, to the right as seen in the drawings, whereby the rivet 10 is held against the workpiece 30. Tension on the mandrel 18 to the left, as seen in the drawings, results in displacement of the "B" stage thermoset resin head forming portion 16 into the mushroom configuration shown in section. The bias on the mandrel 18 is maintained for the length of time necessary to effect complete polymerization of the "B" stage head forming portion 16 which results in locking of the rivet 10 within the apertures in the workpieces 30 and 32. It is to be noted that the head forming portion 16 is mechanically trapped behind the anvil 20 of the mandrel 18. The mandrel 18 can be mechanically clinched to the shear portion 14 or head 12 of the rivet 10, if desired. Alternatively, bonding of the "B" stage thermoset resin to the anvil 20 is sufficient to retain the mandrel 18 in position relative to the shear portion 14.

Referring to FIG. 3 of the drawings, a second embodiment of the invention comprises a rivet 50 having a head portion 52 and shear portion 54 of fully polymerized thermoset resin. The head and shear portions 52 and 54 have a central aperture 56 therein for the acceptance of a mandrel 58. The mandrel 58, like the mandrel 18, has an anvil or head portion 60 thereon to effect compression of a "B" stage thermoset resin head forming portion 62. The dimensions of the blind rivet 50 are similar to those of the rivet 10 and setting of the rivet is similar thereto, the distinction being that the head and shear portions 52 and 54 of the rivet 50 comprise fully polymerized thermoset resin.

With reference to FIG. 4 of the drawings, a blind rivet 70, comprises a head portion 72 and shear portion 74 made from fully polymerized thermoset resin. The head and shear portions 72 and 74 have a central bore 76 therein for the acceptance of a mandrel 78 which also is made from fully polymerized thermoset resin. The mandrel 78 has an anvil 80 thereon for compression of a "B" stage thermoset resin head forming portion 81 in the manner described hereinbefore.

As illustrated in FIGS. 5 and 6, another embodiment of the instant invention comprises a blind rivet 90 having a head portion 92 and shear portion 94. The head and shear portions 92 and 94 comprise fully polymerized thermoset resin. A "B" stage thermoset resin head forming portion 96 is integral with the shear portion 94 and, like the head and shear portions 92 and 94, respectively, has a central bore 98 therein for the acceptance of a mandrel 100. As best seen by comparing FIGS. 5 and 6, tensioning of the mandrel 100 to the left, as seen in the drawings, effects compression and mushrooming of the "B" stage resin head forming portion 96 of the rivet 90. Thus, the embodiment of the instant invention shown in FIGS. 5 and 6, results in a rivet having a one-piece, homogenous shear portion 94, with oppositely disposed head portions 92 and 96.

As illustrated in FIGS. 7 and 8 of the drawings, another embodiment of the instant invention comprises a rivet 120 having a head portion 122 and intermediate shear portion 124 of fully polymerized thermoset resin and a head forming end portion 126 of "B" stage thermoset resin. The distinction between the embodiment taught in FIGS. 7 and 8 and the embodiment taught in FIGS. 5 and 6 is that a mandrel 128 in the rivet 120 comprises fully polymerized thermoset plastic. As best seen by comparing FIGS. 7 and 8, tensioning of the mandrel 128 to the left, as seen in the drawings, results in compression and mushrooming of the "B" stage thermoset resin head forming portion 126 to form a head on the rivet 120 at the opposite side of a pair of workpieces 128 and 130 from the head 122.

With respect to the partially polymerized head forming portions 16, 62, 80, 96 and 126 of the rivets 10, 50, 70, 90 and 120, respectively, which may be termed "B" stage thermoset resin portions, each of said portions is prepared using technology similar to the technology used to prepare powdered resin coatings or electronic encapsulation molding compounds. In this type of system an epoxy resin is blended with an aromatic amine curing agent and allowed to partially polymerize. Representative materials and proportions would be 157.5 parts of Shell 828 epoxy resin obtainable from the Shell Chemical Company and 42.5 parts of methylene dianiline curing agent obtainable from BASF Wyandotte Corporation. When sufficient polymerization has occurred to produce a solid, the "B" stage material is pulverized into a powder. In the case of the rivets 10, 50 and 70 the powder is thereafter molded to form the discrete head forming portions 16, 62, and 80 thereof, respectively. When heat is applied to said head forming portions, the "B" stage material thereof will soften permitting movement of the mandrels 18, 58, and 78, respectively, to axially compress and radially expand said head forming portions 16, 62, and 80 which, when completely polymerized, "set" the rivets 10, 50, and 70, respectively.

In the embodiment of the invention illustrated in FIGS. 5 and 8 of the drawings, the head, shear and head forming portions 92, 94, and 96 of the rivets 90 and 122, 124 and 126 of the rivet 120 are molded from the "B" stage resin. Thereafter the head and shear portions 92 and 94 of the rivet 90 and head and shear portion 122 and 124 of the rivet 120 are fully polymerized by the application of heat while maintaining the head forming portions 96 and 126 thereof sufficiently cool to preclude further polymerization. The application of heat to the head forming portion 96 and 126 of the rivets 90 and 120, respectively will condition the rivets for "setting" in the manner discussed hereinbefore.

It is to be noted that the application of heat to initiate softening and polymerization of the head forming portions of the rivets discussed above is a relative matter. For example, shelf life of the unset blind rivet can be extended by freezing the rivet. Moreover, the amount and duration of heat applied is a function of the particular "B" stage resin utilized. In a constructed embodiment, a blind rivet made in accordance with the constructed embodiment was maintained at a temperature of 0° Farenheit and thereafter elevated to a temperature of 150° to 180° Farenheit by the application of heat to the mandrel of the rivet at which temperature softening was evidenced. Thereafter the temperature was raised to the range of 300° to 400° Farenheit to expedite polymerization.

From the foregoing description it should be apparent that the blind rivet of the instant invention is relatively easily set within a complementary aperture in a workpiece. Softening and polymerization of the "B" stage head forming thermoset resin is achieved by the application of heat that is relatively higher than the design storage temperature of the rivet. As discussed hereinbefore, the addition of heat to the "B" stage resin head forming portion of the rivet can be achieved by several means the important consideration being that the dormant "B" stage resin is activated by the addition of heat thereto which in turn softens the resin to facilitate compression and mushrooming of the head forming portion of the rivet to form a head on the blind side of the workpiece.

While the preferred embodiment of the invention has been disclosed, it should be appreciated that the invention is susceptible of modification without departing from the scope of the following claims.

I claim:

1. A blind rivet for installation in a workpiece having an aperture therein, said rivet comprising an elongated mandrel having a radially enlarged anvil at one end and a gripping portion at the other end, and a workpiece gripping sleeve disposed about said mandrel comprising a shear portion having a radially extending head at one end thereof for engagement with one side of a workpiece and a blind head forming portion of partially polymerized thermoset plastic between said shear portion and the anvil on said mandrel, the blind head forming portion of said shear sleeve being at a first temperature sufficiently low to preclude further polymerization thereof, the head forming portion of said sleeve being axially and radially deformable upon heating thereof above said first temperature and upon axial movement of the anvil on said mandrel toward the head at the one end of the shear portion of said sleeve to form a solid blind head that is engageable with the other side of the workpiece thereby to grip the workpiece upon full polymerization of said blind head.

2. A rivet in accordance with claim 1 wherein the shear portion of said sleeve is metal.

3. A rivet in accordance with claim 1 wherein the shear portion of said sleeve is plastic.

4. A rivet in accordance with claim 3 wherein the head forming portion of said sleeve is integral with the shear portion thereof.

5. A rivet in accordance with claim 4 wherein the shear portion of said sleeve is fully polymerized.

6. A rivet in accordance with claim 1 wherein said mandrel is metal.

7. A rivet in accordance with claim 1 wherein said mandrel is plastic.

* * * * *